UNITED STATES PATENT OFFICE.

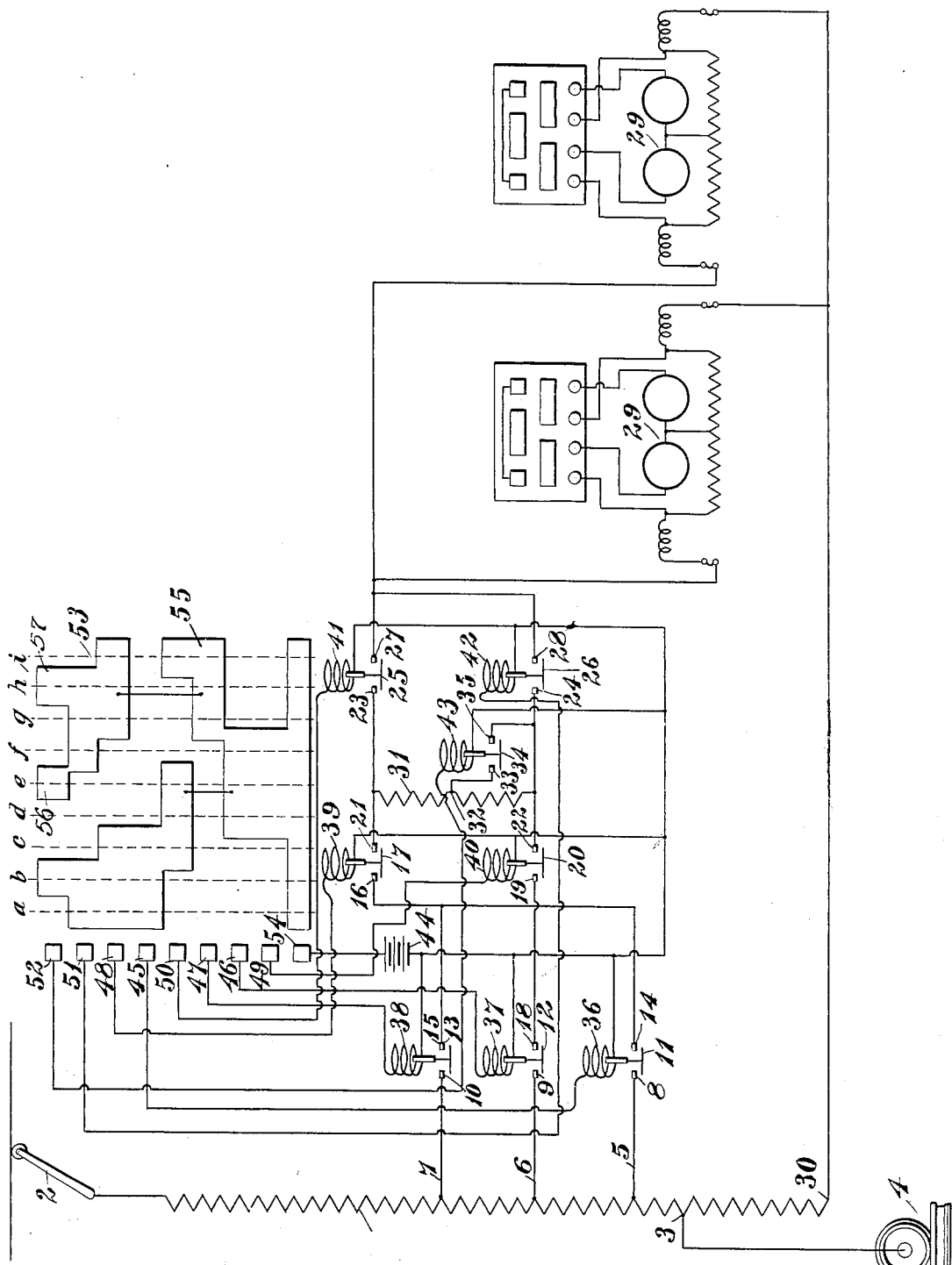

HERMON L. VAN VALKENBURG, OF PITTSBURG, PENNSYLVANIA, ASSIGNOR TO WESTINGHOUSE ELECTRIC & MANUFACTURING COMPANY, A CORPORATION OF PENNSYLVANIA.

CONTROL SYSTEM FOR ELECTRIC MOTORS.

No. 882,658.  Specification of Letters Patent.  Patented March 24, 1908.

Application filed September 2, 1904. Serial No. 223,139.

*To all whom it may concern:*

Be it known that I, HERMON L. VAN VALKENBURG, a citizen of the United States, and a resident of Pittsburg, in the county of Allegheny and State of Pennsylvania, have invented a new and useful Improvement in Control Systems for Electric Motors, of which the following is a specification.

My invention relates to systems of control for electrical apparatus, and it is particularly applicable to systems in which the voltage applied to the translating devices is varied by adjusting the circuit connections to a subdivided transformer winding.

The primary object of my invention is to so organize a control system that the same resistance element may serve as a preventive resistance, when changing the connection between the translating devices and the transformer winding from one point to another, and as a starting or regulating resistance in the circuit of said devices when no such change is being made.

Another object of my invention is to so combine a set of voltage-varying switches and a set of resistance-governing switches that they shall operate in the proper sequence and shall be prevented from operating in any other sequence or order.

My invention is illustrated in the accompanying drawing, the single figure of which represents a system constructed in accordance therewith.

An auto-transformer winding 1 has one terminal connected to a trolley 2 and an intermediate point 3, near its other terminal, connected to the track or grounded conductor 4. Connected to other intermediate points in the transformer winding 1, are leads 5, 6 and 7, which are connected respectively to terminals 8, 9 and 10 of voltage-varying switches 11, 12 and 13. Instead of the auto-transformer 1, a two-winding transformer might be employed, the secondary winding of which should be provided with spaced leads, in a manner similar to that here shown.

Terminals 14 and 15 of the respective switches 11 and 13 are connected together and to terminal 16 of a switch 17, and terminal 18 of switch 12 is connected to terminal 19 of switch 20. Terminals 21 and 22 of the respective switches 17 and 20 are connected to terminals 23 and 24 of resistance-governing switches 25 and 26. The other terminals 27 and 28 of the switches 25 and 26 are connected together and to corresponding terminals of motors 29, the other terminals of which are connected to terminal 30 of the auto-transformer winding 1.

Connected between the terminals 21 and 22 of switches 17 and 20, is a resistance 31, a point 32 intermediate its terminals being connected to terminal 33 of a resistance-governing switch 44 the other terminal 35 of which is connected to the terminal 24 of switch 26. The point 32 may or may not be the middle of the resistance 31, according to the value of resistance steps that may be desired.

The arrangement of motors here shown is only one of many possible arrangements which may be employed in such systems, and since it forms no essential part of my invention I deem it unnecessary to describe it.

The switches 11, 12, 13, 17, 20, 25, 26 and 34 are operated, respectively, by magnet coils 36, 37, 38, 39, 40, 41, 42 and 43, one terminal of each of which is connected to one terminal of a battery 44 and the other terminals of which are respectively connected to contact fingers 45, 46, 47, 48, 49, 50, 51 and 52 of a controller 53. The other terminal of the battery 44 is connected to contact finger 54 of the controller 53.

The operation of my invention may be best understood from a consideration of the individual positions of the controller 53. In position *a*, contact fingers 45, 48 and 51 make contact with controller drum segment 56 and finger 54 makes contact with the drum segment 55 whereby the circuits of the magnet coils 36, 39 and 42 are completed, to effect closure of the corresponding switches 11, 17 and 26. Energy is then supplied from the auto-transformer winding 1 through the lead 5, switches 11 and 17, resistance 31 and switch 26. In position *b* of the controller, contact finger 52 also engages the controller drum segment 56 and the circuit of the magnet coil 43 is thereby completed, to effect closure of the switch 34 and cut out a portion of the resistance 31 from the motor circuit. In position *c*, contact fingers 51 and 52 become disengaged from the drum segment 56 and the finger 50 engages it, thereby completing the circuit of the magnet coil 41 and effecting closure of the switch 25. Energy is then supplied to the motors from the auto-transformer winding 1, through the lead 5 and switches 11, 17 and 25, and all of the resistance is cut out of circuit. In position d, contact fingers 45 and 48 are disengaged from the drum segment 56 and the fingers 46 and 49 engage the segment 55, thereby completing the circuits of magnet coils 37 and 40, which, in turn, close the switches 12 and 20. The motor circuit is then completed from the auto-transformer winding 1 through lead 6, switches 12 and 20, resistance 31 and switch 25. In passing from the position c to position d, the contact fingers 45 and 48 are not disengaged from the drum segment 56 until after the fingers 46 and 49 make contact with segment 55 and, consequently, for an instant, a local circuit is established through the lead 5, a portion of the auto-transformer winding 1, lead 6, switches 12 and 20, resistance 31 and switches 21 and 11. The amount of current in this local circuit is reduced by the resistance 31, which, during the moment of changing from the one position of the controller to the other, acts as a preventive resistance. In position e of the controller 53, contact finger 52 engages the drum segment 57 and the switch 34 is again closed, thereby cutting a portion of the resistance 31 out of the motor circuit. The operation of the system continues in a manner similar to what has just been described.

The circuits of the magnet windings of the switches are here governed entirely by the controller 53 the parts of whch are so constructed and arranged that it may constitute means whereby the switches will be caused to operate in a predetermined order and whereby they will be prevented from operating in other than the predetermined order; that is, the switches 11, 12 and 13 are caused to close successively and switches 11 and 13 are prevented from closing simultaneously in order that a portion of the transformer winding may not be short-circuited thereby. The switches 17 and 20 are caused to close alternately and the resistance-governing switches 25, 34 and 26 are caused to close successively, a reverse order of closure corresponding to closure of successive voltage-varying switches. However, it will be readily understood that, in practice, other means may be employed instead of or in addition to the controller for causing the switches to operate in the desired manner, such, for instance, as interlocking or auxiliary switches that are operated by certain of the main switches.

For the sake of simplicity of illustration only three voltage-varying switches have here been employed, corresponding terminals of the first and the third of which are connected together, but, obviously, a greater number of switches may be employed, in which case corresponding terminals of both sets of alternate switches will be connected in a similar manner to that shown and the order of closure of the switches will also be similar.

While I have shown the switches in the main circuits as electrically operated devices, it is to be understood that they may be electro-pneumatically operated, if desired, the valves which admit the elastic fluid to the cylinders being governed by circuits such as are shown and described herein.

I claim as my invention:

1. In a system of control, the combination of a subdivided transformer winding, a translating device or devices, means for connecting the same between one terminal of the said winding and the various points of subdivision thereof, a resistance and means for connecting the same either between leads from successive points of subdivision of the transformer winding or in series with said leads.

2. In a system of control, the combination of a subdivided transformer winding a translating device or devices, means for connecting the same between points of subdivision of the transformer winding, a resistance and means for connecting the same either between leads from successive points of subdivision of the transformer winding or in series with said leads.

3. In a system of control, the combination of a subdivided transformer winding, a translating device or devices, a resistance, and means for connecting the same either between leads from successive points of subdivision of the transformer winding or in series with said leads.

4. In a system of control, the combination of a subdivided transformer winding, a translating device or devices, means for connecting the same between points of subdivision of the said winding, a resistance, and means for connecting the same between points of subdivision of the transformer winding when a change in connection of the translating device or devices is being made from one to the other and for connecting the same in the circuit of the said devices when no such change is being made.

5. In a system of control, the combination of a subdivided transformer winding, a translating device or devices, means for connecting the same between points of subdivision of the said winding, a resistance which serves alternately to prevent short-circuiting portions of the transformer winding and as a starting or regulating resistance in the circuit of the translating device or devices.

6. In a system of control for electrical apparatus, a source of variable-voltage energy, a resistance and means for including said resistance in the local circuit that is established momentarily in changing from one voltage to another and for including it in the circuit of the said electrical apparatus as a regulating resistance.

7. In a system of control for electrical apparatus, a transformer, means for varying its active length, a resistance, and means for connecting the same in the local circuit that is formed when changing from one length of transformer winding to another and for connecting it in the circuit of the controlled apparatus as a regulating resistance.

8. In a system of control, the combination of a set of separately actuated voltage-varying switches, a set of resistance-governing switches, and means for controlling the operation of both sets of switches.

9. In a system of control, the combination of a set of separately actuated voltage-varying switches, a set of resistance-governing switches and means for preventing simultaneous closure of certain of said voltage-varying switches.

10. In a system of control, the combination of a set of separately actuated voltage-varying switches, a set of resistance-governing switches, means for preventing simultaneous closure of certain of said voltage-varying switches, and means for causing the resistance-governing switches to close successively.

11. In a system of control, the combination of a set of separately actuated voltage-varying switches, a set of separately actuated resistance-governing switches, means for preventing simultaneous closure of certain of said voltage-varying switches, means for causing the resistance-governing switches to close successively, and means for causing each resistance-governing switch to open after a succeeding one has closed.

12. In a system of control, the combination of a set of separately actuated voltage-varying switches, means for effecting successive closure thereof, and means for preventing simultaneous closure of alternate switches of the said set.

13. In a system of control, the combination of a set of separately actuated voltage-varying switches, means for effecting successive closure thereof, means for preventing simultaneous closure of alternate switches of the said set, and a set of resistance-governing switches.

14. In a system of control, the combination of a set of separately actuated voltage-varying switches, means for effecting successive closure thereof, means for preventing simultaneous closure of alternate switches of the said set, a set of resistance-governing switches, and means for effecting successive closure thereof.

15. In a system of control, the combination of a set of separately actuated voltage-varying switches, means for effecting successive closure thereof, means for preventing simultaneous closure of alternate switches of the said set, a set of resistance-governing switches, means for effecting successive closure thereof, and means for causing each of the latter switches to open after a succeeding one has closed.

16. In a system of control, the combination of a set of switches, terminals of alternate switches of the set being connected together, means for effecting successive closure thereof, means for preventing simultaneous closure of alternate switches of said set, and a resistance connected between the terminals of successive switches of the set.

17. In a system of control, the combination of a set of switches, terminals of alternate switches of the set being connected together, means for effecting successive closure thereof, means for preventing simultaneous closure of alternate switches of said set, a resistance connected between the terminals of successive switches of said set, and other switches having terminals connected to said resistance.

18. In a system of control, the combination of a set of main switches, terminals of alternate switches of the set being connected together, means for effecting successive closure thereof, means for preventing simultaneous closure of alternate switches of said set, a resistance connected between the terminals of successive switches of the set, other switches having terminals connected to the said resistance, and means for effecting successive closure thereof.

19. In a system of control, the combination with a subdivided transformer winding and a translating device or devices, of means for connecting the same between points of subdivision of the said winding, a resistance, means for connecting the same first between leads from successive points of subdivision of the transformer winding and then in series with one of said leads, and means for cutting the said resistance out of the circuit of said translating device or devices.

20. In a system of control, the combination with a translating device or devices, a transformer winding which is subdivided by means of leads, and switches located in said leads, of means for preventing the switches in alternate leads being closed simultaneously.

21. In a system of control, the combination with a translating device or devices, and a transformer winding which is subdivided by means of leads, of switches in said leads, a resistance connected between terminals of successive switches of the set, and switches, having terminals connected to the said resistance.

22. In a system of control, the combination with a translating device or devices and a transformer winding which is subdivided by means of leads, of switches in said leads, means for preventing simultaneous closure of alternate switches of the set, a resistance connected between terminals of said switches, and switches having terminals connected to the said resistance.

23. In a system of control, the combination with a translating device or devices and a transformer winding which is subdivided by means of leads, of switches in said leads, a resistance connected between terminals of successive switches of the set, switches having terminals connected to the said resistance, and means for causing one of said switches to open after another has closed.

24. In a system of control, the combination with a translating device or devices and a transformer winding which is subdivided by means of leads, of switches in said leads, means for preventing simultaneous closure of alternate switches of the set, a resistance connected between terminals of said switches, switches having terminals connected to the said resistance, and means for causing one of said switches to open after another has closed.

25. In a system of control, the combination with one or more translating devices, a source of electrical energy, a transformer winding supplied therefrom, leads connected to said winding, a set of switches having corresponding terminals at one side connected to said leads and alternate corresponding terminals at the other side connected together, a resistance connected between the terminals of successive switches, and other switches having terminals connected to said resistance and the remaining terminals connected together and to said translating devices.

26. In a system of control, the combination with one or more translating devices, a source of electrical energy, a transformer winding supplied therefrom, leads connected to said winding, switches having one set of corresponding terminals connected to said leads and another set of corresponding terminals alternate, terminals of which are connected together, means for effecting successive closure of said switches, a resistance connected between the terminals of successive switches, and other switches having terminals connected to said resistance and the remaining terminals connected together and to said translating devices.

27. In a system of control, the combination with one or more translating devices, a source of electrical energy, a transformer winding supplied therefrom, leads connected to said winding, switches having one set of terminals connected to said leads and another set, the alternate terminals of which are connected together, means for effecting successive closure of said switches, means for preventing simultaneous closure of alternate switches, a resistance connected between the terminals of successive switches, and other switches having terminals connected to said resistance and the remaining terminals connected together and to said translating devices.

28. In a system of control, the combination with one or more translating devices, a source of electrical energy, a transformer winding supplied therefrom, leads connected to said winding, switches having one set of terminals connected to said leads and another set, the alternate terminals of which are connected together, a resistance connected between the terminals of successive switches, other switches having terminals connected to said resistance and the remaining terminals connected together and to said translating devices, and means for effecting successive closure thereof.

29. In a system of control, the combination with one or more translating devices, a source of electrical energy, a transformer winding supplied therefrom, leads connected to said winding, switches having one set of terminals connected to said leads and another set, the alternate terminals of which are connected together, a resistance connected between the terminals of successive switches, other switches having terminals connected to said resistance and other terminals connected together and to said translating devices, means for effecting successive closure thereof and means for causing each of the latter switches to open after a succeeding switch has closed.

30. In a system of control, the combination with a source of multiple voltage, a distributing circuit and a set of separately actuated switches for connecting the distributing circuit to the said source, of means for preventing simultaneous closure of alternate switches of the said set.

31. In a system of control, the combination with a source of multiple voltage, a distributing circuit and a set of separately actuated switches for connecting the distributing circuit to the said source, of means for effecting successive closure of the switches and means for preventing simultaneous closure of alternate switches of the set.

32. In a system of control, the combination with a source of multiple voltage and a set of voltage-varying switches, of a resistance, a set of resistance-governing switches, means for causing the resistance-governing switches to close successively and means for causing the order of closure of the resistance governing switches to be reversed after the operation of successive voltage-varying switches.

33. In a system of control, the combination with a source of multiple voltage, a distributing circuit and a set of separately actuated switches for connecting the distributing circuit to the source of multiple voltage, of a resistance and a set of switches for varying the amount of the resistance that is included in the distributing circuit.

34. In a system of control, the combination with a source of multiple voltage, a distributing circuit and a set of separately actuated switches for connecting the distributing circuit to the source of multiple voltage, of means for preventing simultaneous operation of alternate switches of said set, a resistance, and means for varying the amount of the resistance that is included in the distributing circuit.

35. In a system of control, the combination with a source of multiple voltage, a distributing circuit and means for connecting the distributing circuit to the source of multiple voltage, of a resistance and means for connecting the resistance alternately between alternate switches of said set and in the distributing circuit.

36. In a system of control, the combination with a source of multiple voltage, a distributing circuit and a set of switches for connecting the distributing circuit to the source of multiple voltage, of a resistance and means for including the resistance in a local circuit with successive switches of said set when both are closed and in the distributing circuit when only one of them is closed.

37. In a system of control, the combination with a source of multiple voltage, a distributing circuit and a set of switches for connecting the distributing circuit to the source of multiple voltage, of a resistance, means for connecting the resistance alternately between successive switches of said set and the distributing circuit, and means for varying the amount of the resistance that is included in the distributing circuit.

In testimony whereof, I have hereunto subscribed my name this 23rd day of August 1904.

HERMON L. VAN VALKENBURG.

Witnesses:
OTTO S. SCHAIRER,
H. A. SCHAUB.